United States Patent [19]

Pipis et al.

[11] Patent Number: 5,072,848
[45] Date of Patent: Dec. 17, 1991

[54] ELECTRICAL ENCLOSURE WITH TRIM PANEL SUPPORT

[75] Inventors: George C. Pipis, Naperville, Ill.; George L. Lambert, III, Lilburn, Ga.

[73] Assignee: Siemens Energy & Automation, Inc., Alpharetta, Ga.

[21] Appl. No.: 586,639

[22] Filed: Sep. 21, 1990

[51] Int. Cl.⁵ .............................................. H02G 3/14
[52] U.S. Cl. ..................................... 220/241; 174/66
[58] Field of Search ................. 220/241, 242; 174/50, 174/66, 67

[56] References Cited

U.S. PATENT DOCUMENTS

| | | | |
|---|---|---|---|
| 926,246 | 6/1909 | Dorff | 220/241 X |
| 1,773,152 | 8/1930 | Ostler | 220/241 X |
| 2,738,475 | 3/1956 | Beach | 220/242 |
| 3,618,804 | 11/1971 | Krause | 174/66 X |
| 3,619,477 | 11/1971 | Rasmussen | 174/66 |
| 3,808,509 | 4/1974 | Frazier | 220/242 X |
| 3,859,454 | 1/1975 | Mann | 174/66 |
| 4,353,759 | 10/1982 | Stallings | 174/66 X |
| 4,359,619 | 11/1982 | Bergoltz | 220/241 X |
| 4,517,623 | 4/1985 | Barner et al. | 361/358 |

Primary Examiner—Stephen Marcus
Assistant Examiner—Nova S. Tucker
Attorney, Agent, or Firm—Peter A. Luccarelli, Jr.; James G. Morrow

[57] ABSTRACT

An electrical enclosure (10) having a box (12) having an open side, a trim panel (20) for covering the box open side, a support tab (22) and an aperture for receiving the support tab (22). A portion of the aperture edge may be formed by a flange edge (18). The support tab (22) supports the weight of the trim panel (20) during installation of trim panel fasteners (28) into holes (16, 24) formed in the box (12) and trim panel (20), respectively. The support tab (22) may be formed simultaneously with the trim panel fastener hole (24) in a stamping operation.

10 Claims, 2 Drawing Sheets

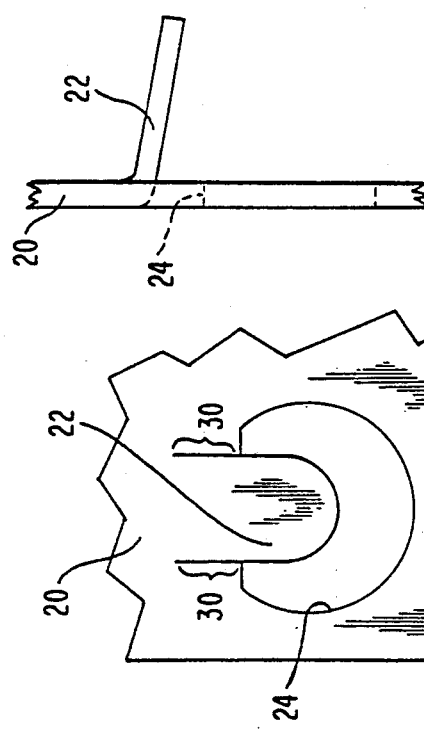
FIG. 3
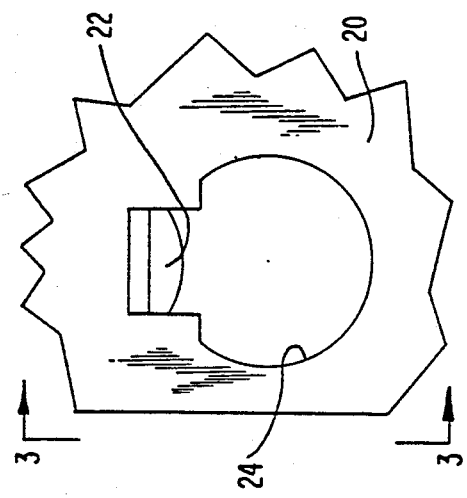
FIG. 2
FIG. 4
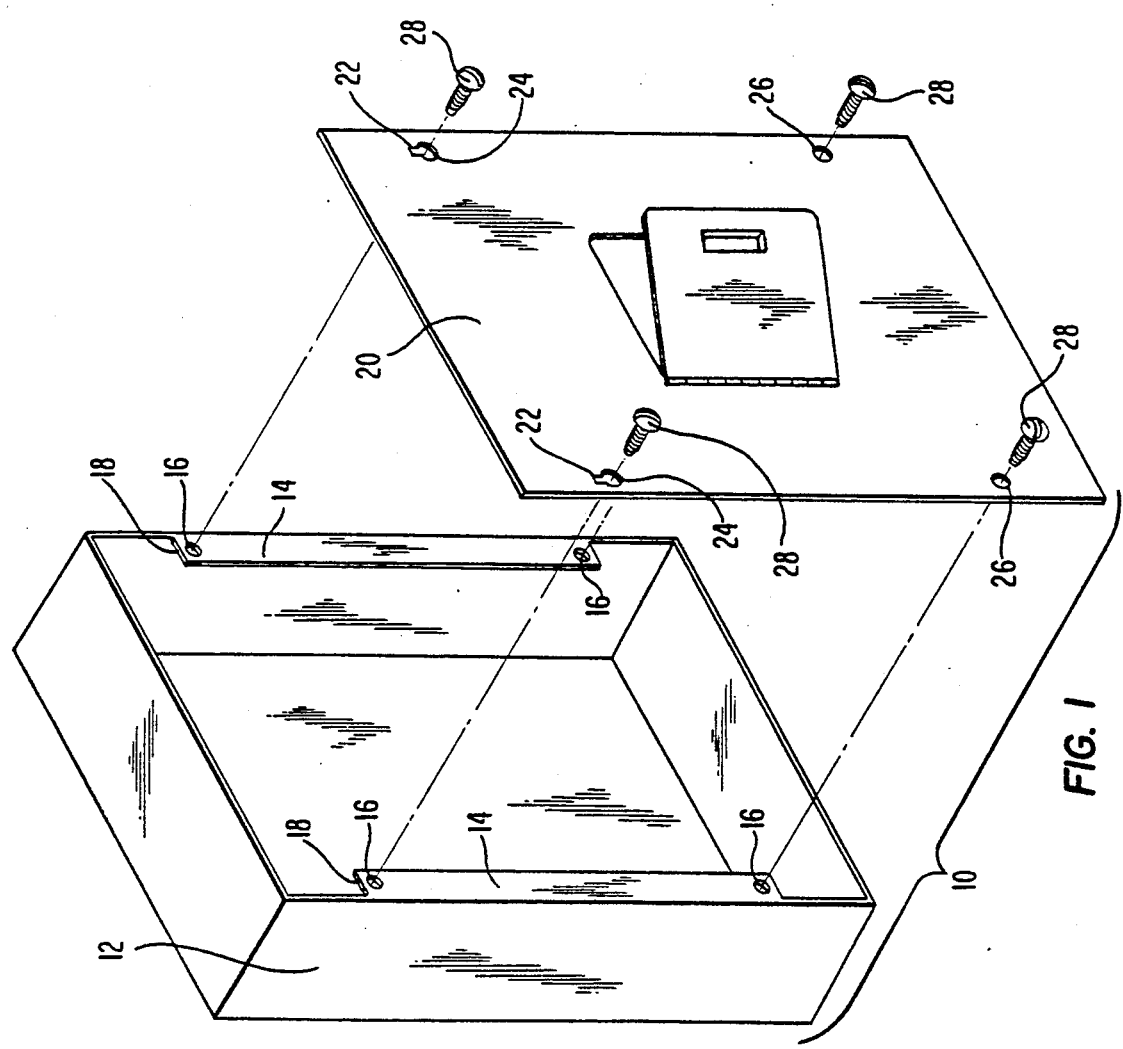
FIG. 1

ELECTRICAL ENCLOSURE WITH TRIM PANEL SUPPORT

BACKGROUND OF THE INVENTION

The present invention relates to electrical enclosures having boxes and trim panels and particularly tabs for supporting and aligning the enclosure trim panel with the enclosure box.

Electrical enclosures, such as low-voltage, circuit protection load centers, often have a box with an open side for access to the interior of the enclosure that is installed between wall studs of a building partition, so that the open side of the box is flush with the partition outer surface. The enclosure is in turn covered by a trim panel which is of generally planar construction for flush fit with the box and partition. The trim panel is attached to the box with fasteners, such as screws, which pass through holes formed in the trim panel. The trim panel generally has a hinged access door which allows user manipulation of circuit breaker actuation handles located in the panel.

When installing a trim panel on an electrical enclosure box, the electrician is faced with the problem of attempting to align fastener holes formed in the trim panel with corresponding fastener holes located in the box. The trim panel is often constructed of stamped sheet metal and often weighs between 2 and 10 pounds. During installation of the trim panel, the electrician is attempting to line a generally flat, heavy cover with a flat wall surface, while trying simultaneously to align fastener holes in the trim panel with the box fastener holes. Trim panel installation is often a time-consuming and frustrating experience for the electrician.

Past attempts to remedy difficulties in installing trim panels over electrical enclosure boxes have led to limited success. One known past solution has been to have a first electrician hold the trim cover and assume most of the responsibility for bearing its weight, while a second electrician visually aligns the trim cover holes with the box holes and performs precision alignment. Upon alignment, one of the electricians then installs the trim panel fasteners. This known solution doubles the number of highly-paid tradesman necessary to install the trim panel.

Another known attempt to solve the trim panel installation alignment problem is to utilize one or more locating pins, having a diameter smaller than the trim panel fasteners. The locating pins are separately inserted in one or more of the trim panel fastener holes and positioned in the corresponding box fastener hole. To practice this solution, the electrician has to keep and maintain a separate set of alignment pins, which can be easily lost. Also, the alignment pin must be removed before a fastener ultimately can be placed in the pin location, which increases the number of steps necessary to install the trim panel.

Another known solution for aligning trim panels is to utilize a fastener having a stepped tip with a diameter less than the diameter of the fastener threads. This type of stepped fastener has an integral alignment pin. However, during installation of at least the first two stepped fasteners, the corresponding holes in the trim panel and box for receipt of the fastener have to be aligned visually or aligned by tactile feel as the electrician wiggles the fastener in the trim panel fastener hole with his fingers as he attempts to engage the box fastener holes. Also, during installation of at least the first two stepped fasteners, the electrician still must hold up the weight of the trim panel and perform at least the gross alignments of the trim panel and box screw holes, so that the step fastener can be located in the holes and maneuvered to its final alignment position.

U.S. Pat. No. 4,517,623 shows trim supports secured to the rear face of a trim ring 14. The trim supports are described as fitting between lateral sidewalls of the enclosure box which engage the edge of the bottom sidewall of the enclosure box. It is stated in the patent that the trim supports allow the installer to rest the trim panel on the enclosure box's lower edge to support the assembly while it is being secured in place. However, the supports of the '623 patent do not fully support the trim panel weight and maintain alignment between the trim panel and box fastener holes, because the trim panel can tip away from the box about a rocking axis established by contact of the supports with the box lower edge.

It is an object of the present invention to create an electrical enclosure support which allows for vertical and horizontal alignment of the trim panel with the box, so that the trim panel fasteners can be installed by a single person.

It is a second object of the present invention to create a trim panel support tab that supports the weight of the trim panel until the electrician can perform final alignment of the trim panel fastener holes with those of the box.

It is another object of the present invention to create a trim panel support tab that does not block trim panel fastener holes during panel and pan alignment, while fully supporting the trim panel weight.

It is an additional object of the present invention to create a trim panel supporting tab that requires no additional tools or separate parts in order to align and fully support the weight of the trim panel.

SUMMARY OF THE INVENTION

These objects have been attained by the electrical enclosure with trim panel support of the present invention which comprises a box having an open side for access to the box interior; a trim panel for covering the box open side; a support tab attached to and projecting from one of the box and trim panel proximal a top edge thereof; and means for engaging the support tab and fully supporting the trim panel on the other of the box and trim panel.

Other embodiments of the present invention include an electrical enclosure comprising a box having an open side for access to the pan interior; a trim panel for covering the box open side; a support tab integrally formed in and projecting from one of the box and trim panel; and an aperture formed in the other of the box and trim panel for engagement of the support tab therein and for fully supporting weight of the trim panel.

The electrical enclosure with trim panel support tab of the present invention allows vertical and horizontal self-alignment of the trim panel relative to the box and also fully supports the weight of the trim panel, so that the electrician can install the trim panel fasteners without having to support the trim panel weight manually. The trim panel support tab of the present invention allows a quicker installation of the trim panel by a single electrician.

BRIEF DESCRIPTION OF THE DRAWINGS

FIG. 1 is a exploded perspective view of the box, trim panel, trim panel support tabs and trim panel fasteners of the present invention.

FIG. 2 is a top plan view of the trim panel support tab of the present invention as shown in a fragmented plan view of the trim panel.

FIG. 3 is a side elevational view of the support tab shown in FIG. 2.

FIG. 4 is a fragmented, top-plan view of the stamping blank used to create the trim panel support tab embodiment of FIGS. 2 and 3.

DESCRIPTION OF THE PREFERRED EMBODIMENTS

Figure 5:
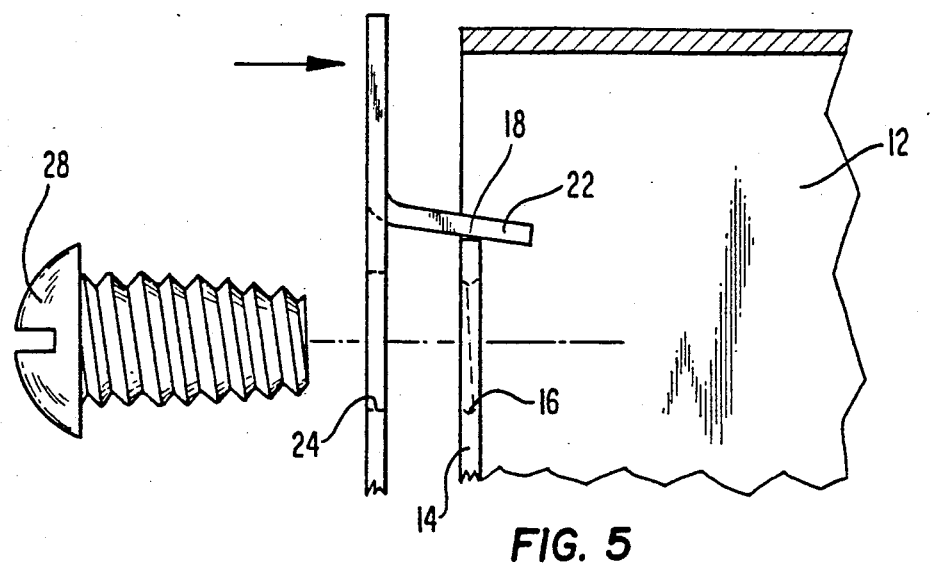
FIG. 5 is a fragmented, side-elevational exploded view of the trim panel support tab of FIGS. 2 and 3, showing the self-alignment of the trim panel fastener hole and box fastener hole accomplished by the present invention.

The electrical enclosure 10 having a trim support tab of the present invention is shown in perspective exploded view in FIG. 1. The electrical enclosure 10 has a box 12 having an open side for access to the interior of the enclosure. The box 12 has flanges 14 and fastener holes 16 for receipt of fasteners formed in the flanges. The box flanges 14 also have top edges 18. As can be seen in FIG. 1, the top edges 18 form part of the aperture which forms the entire opening to the box. The electrical enclosure 10 has also a trim panel 20 for covering the box 12 open side. The box 12 is generally installed between partition studs (not shown) so that the box flanges 14 are generally flush with the partition wall surface.

Referring to FIGS. 1 through 3, the trim panel 20 has support tabs 22 which in the preferred embodiment are integrally formed in and projecting from the trim panel 20. The trim panel 20 has a pair of apertures 24 which are adjacent the support tabs 22. The trim panel fastener holes 24 mate with corresponding upper pair of fastener holes 16 in the box flanges 14. The trim panel 20 also has a pair of lower fastener holes 26 which are for alignment with the lower pair of fastener holes 16 in box flanges 14. The corresponding pairs of fastener holes 24, 16 and 26, 16 in the trim cover 20 and box 12 are constructed to receive threaded fasteners 28 when the holes are in axial alignment.

As shown in FIG. 4, the support tab 22 is integrally formed in the trim panel 20 and is manufactured along with the trim cover fastening hole 24 during a common stamping operation. The preferred layout of the stamping blank is shown in FIG. 4, which is accomplished by lancing a pair of slits 30 in the panel 20 in conjunction with the generally u-shaped aperture which forms the cover fastener hole 24. The support tab 22 is then bent so that it projects away from the interior facing side of the cover 20, so that the fastener hole 24 is now of sufficient diameter to receive the shank of one of the cover fasteners 28.

FIG. 5 shows the operation of the support tab 22 of the present invention and its engagement with the flange edge 18 of box 12, for self-alignment of the trim panel 20 relative to the box 12 and for fully supporting weight of the trim panel 20, so that the threaded fastener 28 can in turn be inserted through the axially-aligned trim panel fastener hole 24 and box fastener hole 16. As is seen in FIG. 5, the support tab 22 rests on top of the flange edge 18 and establishes relative vertical alignment of the fastener holes 24 and 16. Relative horizontal alignment of the fastener holes 24 and 16 is accomplished by final, precise alignment of the fastener holes, either visually or by wiggling fastener 28 in through fastener hole 24 until the tip of the fastener engages box fastener hole 16. Final, precise horizontal alignment of holes 24 and 16 is simplified because the weight of the trim cover 20 is now supported by support tab 22 engagement with flange edge 18.

Alternatively, instead of using the flange edge 18 as the means for engaging the support tab 22 and inhibiting lateral relative movement of the trim panel 20 and box 12, an aperture, such as a drilled or stamped hole, can be formed in the box flange 14 and support tab 22 could be inserted into that alignment hole. In such an embodiment, the engagement of the support tab in the aperture self-aligns the fastener holes 16 and 24 both horizontally and vertically.

Figure 6:
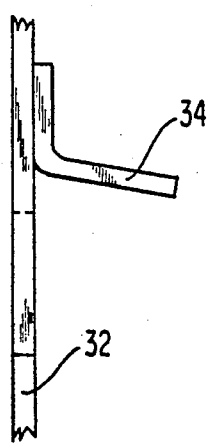
FIG. 6 is a fragmented, side-elevational view of another embodiment of a trim panel support tab of the present invention.
Figure 7:
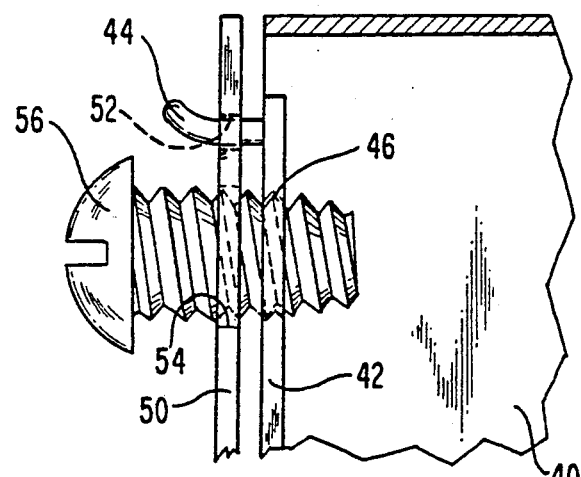
FIG. 7 is a fragmented, side view of another embodiment of an electrical enclosure trim panel support tab of the present invention.
Figure 8:
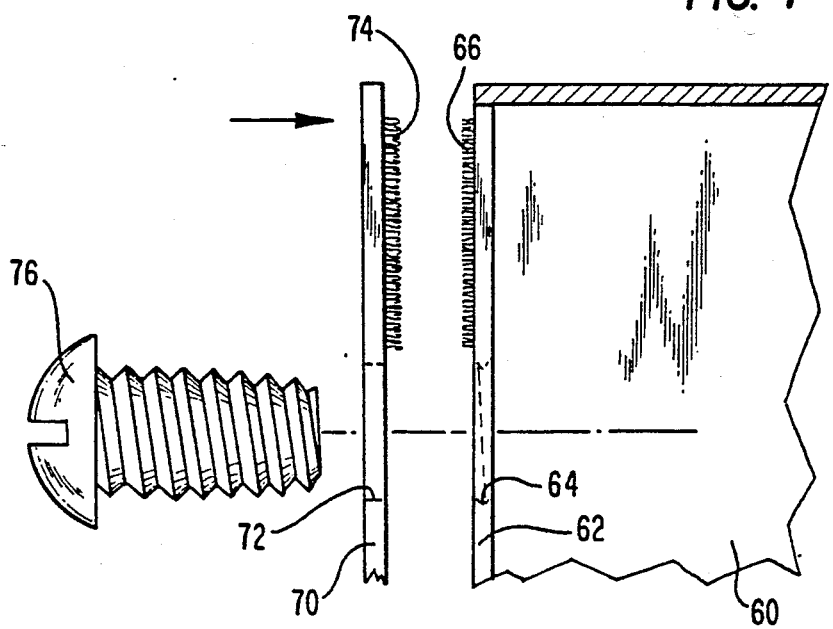
FIG. 8 is a fragmented, side-elevational view of another embodiment of an electrical enclosure with trim support tab of the present invention.

Alternate embodiments of support tabs 34, 44, 74 are shown in FIGS. 6 through 8. In FIG. 6, the trim panel 32 has a support tab 34, which is shown as an L-shaped piece of sheet metal that is rigidly attached to the trim panel 32 by spot welding, brazing, riveting, threaded fasteners or other forms of attachment well known in the electrical enclosure art.

In the embodiment shown in FIG. 7, box 40 has a flange 42 with a support tab 44 projecting from the box flange 42 and a fastener hole 46. The box support tab 44 engages trim panel 50 through trim panel positioning apertures 52 that receive the support tabs 44. Upon engagement, the trim panel 50 is horizontally and vertically self-aligned with respect to the box 40 and fully supported for fastener hole alignment. The trim panel 50 has fastener holes 54 through which pass the trim panel fasteners 56, that in turn engage the box 40 fastener holes 46.

FIG. 8 shows another embodiment of the trim tab 74 of the present invention. The electrical enclosure of this embodiment has a box 60 with a flange 62 and box fastener holes 64 formed therein. The flange 62 has a strip of flame retardant loop portion 66 of a hook-and-loop fastening system. One manufacturer of such hook-and-loop fastening systems markets its product under the trademark VELCRO. In this embodiment, the trim panel 70 has fastener holes 72 formed therein. The support tab in this embodiment is a flame retardant hook portion 74 of the hook-and-loop fastening system, which is attached to the trim panel 70. In this embodiment the electrician mates the hook (support tab) 74 and loop (means for engaging the support tab) 66 portions of the fastening systems and presses the two portions of the fastening system together, which maintains the trim panel fastener holes 72 in alignment with the pan fastener holes 64 while fully supporting the trim panel 70 weight.

The foregoing description of the preferred embodiments of the present invention is intended to illustrate without limitation the present invention. It is understood that changes and variations can be made therein without departing from the scope of the invention which is defined by the follow claims.

What is claimed is:

1. An electrical enclosure comprising:
   a box having an open side for access to an interior thereof;
   a trim panel for covering the box open side;
   an aperture formed in one of the box and trim panel proximal a top portion thereof;
   a support tab integrally stamped within the aperture and projecting from one of the box and trim panel and
   means for engaging the support tab and fully supporting trim panel on the other of the box and trim panel.

2. The electrical enclosure of claim 1, wherein the support tab forms an L-shape with the one of the trim panel and box.

3. The electrical enclosure of claim 1, wherein the support tab is formed from at least a portion of the material displaced during formation of the aperture.

4. The electrical enclosure of claim 1, wherein the means for receiving the support tab is an aperture.

5. An electrical enclosure comprising:
   a box having an open side for access to an interior thereof;
   a trim panel for covering the box open side;
   an opening formed in one of the box and trim panel;
   a support tab integrally stamped in and projecting from the one of the box and trim panel, where the tab is formed from at least a portion of the material displaced during formation of the opening; and
   an aperture formed in the other of the box and trim panel for engagement of the support tab therein and for fully supporting the weight of the trim panel.

6. The electrical enclosure of claim 5, wherein the box has at least one flange oriented parallel to the open side and at least a portion of an edge which forms the aperture also forms an edge of the flange.

7. An electrical enclosure comprising:
   a box having an open side for access to an interior thereof;
   a trim panel for covering the box open side;
   a trim panel fastener mounting hole formed in one of the box and trim panel;
   a support tab integrally formed in the one of the box and trim panel, where the tab is fabricated from at least a portion of the material displaced during formation of the mounting hole;
   means for engaging the support tab and fully supporting the trim panel on the other of the box and trim panel; and
   a fastener adapted to pass through the mounting hole and engage the other of the box and trim panel.

8. The enclosure of claim 7, where the other of the box and trim panel includes a fastener engagement hole.

9. An electrical enclosure comprising:
   a box having an open side for access to an interior thereof;
   a trim panel for covering the box open side;
   a generally U-shaped aperture formed in the trim panel proximal a top portion thereof;
   a support tab, formed within the generally U-shaped aperture, projecting from h trim panel, where the support tab and aperture are simultaneously formed by lancing a pair of slits in the trim panel proximal a top portion thereof and partially stamping out the support tab such that the U-shaped aperture is formed; and
   means for engaging the support tab and fully supporting the trim panel on the box.

10. An electrical enclosure comprising:
    a box having an open side for access to an interior thereof and having at least one fastener hole;
    a trim panel for arrangement adjacent to the open side and having at least one aperture;
    a plurality of hook portions of a hook-and-loop fastening system attached to one of the box and trim panel proximal a top portion thereof; and
    a plurality of loop portions of the hook-and-loop fastening system attached to the other of the box and trim panel such tat the at least one fastener hole is aligned with at least one aperture when the trim panel is supported adjacent the box by the engagement of the hook-and-loop portions.

* * * * *